United States Patent [19]
Spaenig et al.

[11] 3,872,166
[45] Mar. 18, 1975

[54] IMPROVEMENT IN THE RECOVERY OF GLYOXYLIC ACID

[76] Inventors: Hermann Spaenig, 5 Eschkopfstrasse, 6703 Limburgerhof; Toni Dockner, 6 In der Grossgasse, 6701 Meckenheim; Helmut Karn, 120 Sternstrasse, 6700 Ludwigshafen, all of Germany

[22] Filed: June 25, 1973

[21] Appl. No.: 373,011

[30] Foreign Application Priority Data
July 1, 1972 Germany............................ 2232352

[52] U.S. Cl. ........................ 260/526 R, 260/535 R
[51] Int. Cl. ............................................ C07c 59/10
[58] Field of Search ...................... 260/535 R, 526 R

[56] References Cited
OTHER PUBLICATIONS
Calmon, C. et al., Ion Exchangers in Organic and Biochemistry, Interscience Pub. Inc., N.Y., 1957, p. 619.

*Primary Examiner*—Lorraine A. Weinberger
*Assistant Examiner*—Paul J. Killos

[57] ABSTRACT

A process for the recovery of glyoxylic acid as a byproduct in the synthesis of glyoxal by elution of the ion exchanger used for purifying the glyoxal and crystallization of sodium glyoxylate at a pH of from 3 to 6 from the aqueous eluate.

2 Claims, No Drawings

IMPROVEMENT IN THE RECOVERY OF GLYOXYLIC ACID

The invention relates to a process for the recovery of glyoxylic acid as a byproduct in a process in which mainly glyoxal is formed by oxidation of acetaldehyde with nitric acid.

The production of glyoxal by oxidation of acetaldehyde with nitric acid is known (cf. Houben-Weyl, volume 7/1, page 1957 (1954)). The reaction does not proceed uniformly and various byproducts in varying amounts are obtained depending on the method used. A typical reaction mixture may contain for example (in addition to glyoxal) acetic acid, glycolic acid, oxalic acid, formic acid and particularly glyoxylic acid. Glyoxylic acid is an intermediate required for other syntheses, for example for the production of allantoin. In the said production of glyoxal, glyoxylic acid is as a rule formed in an amount of about 10 percent.

Glyoxal is first separated from the aqueous reaction mixture containing mainly glyoxal, glyoxylic acid and nitric acid by passing the mixture over a basic ion exchanger so that the carboxylic acids are retained.

The carboxylic acids can be eluted by careful treatment of the ion exchanger for example with an aqueous solution of an alkali metal bicarbonate and are then present as an aqueous solution of their alkali metal salts.

The difficulty in recovering glyoxylic acid is that it is very sensitive as compared with other carboxylic acids. For example if one carries out acidification with a mineral acid or treatment with an acid ion exchanger followed by evaporation of the resultant solution of the free acid, a resinified and discolored concentrate is obtained which can no longer be processed economically to recover glyoxylic acid. On the other hand glyoxylic acid cannot be isolated from the aqueous solution by distillation and it is so readily soluble that it is also not recoverable by crystallization.

It is therefore an object of the invention to provide a process by means of which glyoxylic acid formed as a byproduct in the production of glyoxal can be isolated in a pure form.

We have found that pure glyoxylic acid (or the sodium salt thereof) is obtained with advantage from the regeneration liquor obtained in the treatment of the reaction mixture from the production of glyoxal with a basic ion exchanger followed by elution of the ion exchanger, by treating the ion exchanger containing glyoxylic acid with caustic soda solution, sodium carbonate solution or sodium bicarbonate solution, adjusting the pH of the eluate containing from 1 to 15 percent of glyoxylic acid to from 3 to 6 and concentrating it to such an extent, with or without cooling, that sodium glyoxylate is precipitated and, if desired, liberating glyoxylic acid from the sodium glyoxylate by acidification by a conventional method. If desired, concentration may be continued after separation of the sodium glyoxylate first precipitated.

Such a process cannot be discovered by simple specialist considerations, for example based on a knowledge of the dissociation constants of the various carboxylic acids which accompany glyoxylic acid. It has been found however that the process can be carried out in the case of a fairly wide range of different concentration relationships of the various carboxylic acids if a pH of from 3 to 6 and particularly of from 4 to 5 is maintained and cooling is carried out if necessary. Apparently under these conditions the accompanying contaminants of the glyoxylic acid or salts thereof are much more readily soluble than the sodium salt of glyoxylic acid.

Suitable regeneration liquors contain for example from 2.5 to 3.5 percent of glyoxylic acid together with up to 0.1 percent of each of acetic acid, glycolic acid and oxalic acid, also formic acid and minor amounts of other impurities.

Concentration may be carried out continuously or batchwise. In continuous concentration it is convenient to use a multistage procedure, the pressure of the system being lowered from stage to stage in order that steam from each preceding stage may be used as steam for heating the next stage. The operating pressure may be for example from several atmospheres to moderately subatmospheric pressure. Examples of suitable pressures are from 4 atmospheres gauge to 40 mm Hg. Concentration may also be carried out however at constant pressure, for example at atmospheric pressure. Crystallization and separation of the solid may be carried out by conventional methods. The salt recovered is conveniently washed with a small amount of water and may be further processed in dry or moist condition. It may be used for further reactions, as for example the production of allantoin. To recover free glyoxylic acid the sodium glyoxylate is conveniently suspended in a nonaqueous solvent and acidified. Polar solvents such as alcohols, ketones, esters and the like are preferably used. The choice is solely determined by the ability of the solvent to dissolve glyoxylic acid. The suspension is chosen so that the concentration of glyoxylic acid in the solvent is from for example 10 to 50 percent. Glyoxylic acid is caused to pass into solution by transsalting with mineral acid. Examples of suitable mineral acids are hydrogen chloride, concentrated sulfuric acid and concentrated phosphoric acid. The acid is advantageously added in a stoichiometric amount at a temperature of from 0° to 60°C, preferably in the region of ambient temperature, to the suspension of sodium glyoxylate. The whole should be well mixed during acidification. The reaction period may be shortened by using the sodium glyoxylate in a very finely divided form.

The salt of the mineral acid which is insoluble in organic solvents is separated by a conventional method. The filtrate containing glyoxylic acid may be used immediately for further reactions. The glyoxylic acid may however also be transferred into an aqueous solution by adding water and then distilling off the organic solvent. The aqueous solution is practically colorless and almost devoid of impurities.

The following Examples illustrate the invention.

EXAMPLE 1

1000 kg of regeneration liquor having a content of about 3 percent of glyoxylic acid (in addition to small amounts of oxalic acid, acetic acid and glycolic acid) is adjusted to pH 4 with sulfuric acid and concentrated continuously to about 150 kg in a cascade in six stages at 350 mm Hg and a temperature of from 70° to 100°C. The crystal slurry obtained is cooled to 5°C and centrifuged and the crystals are washed with a small amount of ice-water and dried in vacuo at 50°C. 20 kg of sodium glyoxylate having a content of 50 percent of glyoxylic acid is obtained with small amounts of sodium formate, sodium acetate and sodium sulfate.

EXAMPLE 1a 50 kg of sodium glyoxylate has 150 kg of methanol added to it and the whole is heated to 50°C. Concentrated sulfuric acid is added in a stoichiometric amount over six hours and the whole is stirred at 50°C for another twelve hours. It is then cooled to 20°C. The salt is separated, 100 liters of water is added to the separated solution and the methanol is distilled off. 45 kg of 50 percent aqueous glyoxylic acid solution is obtained.

We claim:

1. A process for the recovery of pure glyoxylic acid or sodium glyoxylate from the regeneration liquor obtained in the treatment of reaction mixtures from the production of glyoxal with a basic ion exchanger and elution of the ion exchanger wherein the ion exchanger containing glyoxylic acid is eluted with caustic soda solution, sodium carbonate solution or sodium bicarbonate solution, the eluate containing from 1 to 15 percent of glyoxylic acid is adjusted to a pH of from 3 to 6 and concentrated to such an extent, with or without cooling, that sodium glyoxylate is precipitated.

2. A process as claimed in claim 1 wherein glyoxylic acid is liberated from the precipitated sodium glyoxylate by acidification.

* * * * *

UNITED STATES PATENT AND TRADEMARK OFFICE
CERTIFICATE OF CORRECTION

PATENT NO. : 3,872,166
DATED : March 18, 1975
INVENTOR(S) : Hermann Spaenig et al.

It is certified that error appears in the above-identified patent and that said Letters Patent are hereby corrected as shown below:

In the heading insert --[73] Assignee: Badische Anilin and Soda-Fabrik Aktiengesellschaft, Ludwigshafen (Rhine) Germany--.

*Signed and Sealed this*

*twentieth* Day of *April 1976*

[SEAL]

*Attest:*

RUTH C. MASON
*Attesting Officer*

C. MARSHALL DANN
*Commissioner of Patents and Trademarks*